United States Patent
Teslenko et al.

(10) Patent No.: US 10,547,365 B2
(45) Date of Patent: Jan. 28, 2020

(54) BEAMFORMING IN A WIRELESS COMMUNICATION SYSTEM

(71) Applicant: Telefonaktiebolaget LM Ericsson (publ), Stockholm (SE)

(72) Inventors: Maxim Teslenko, Sollentuna (SE); Hongxin Liang, Upplands Väsby (SE); Sibel Tombaz, Stockholm (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/329,802

(22) PCT Filed: Sep. 26, 2016

(86) PCT No.: PCT/EP2016/072804
§ 371 (c)(1),
(2) Date: Mar. 1, 2019

(87) PCT Pub. No.: WO2018/054498
PCT Pub. Date: Mar. 29, 2018

(65) Prior Publication Data
US 2019/0199419 A1    Jun. 27, 2019

(51) Int. Cl.
*H04W 16/28* (2009.01)
*H04B 7/06* (2006.01)
(Continued)

(52) U.S. Cl.
CPC ........... *H04B 7/0617* (2013.01); *G08G 1/123* (2013.01); *H04W 4/029* (2018.02)

(58) Field of Classification Search
CPC .... H04B 7/0617; H04W 4/029; H04W 16/28; G08G 1/123
See application file for complete search history.

(56) References Cited

U.S. PATENT DOCUMENTS

2015/0208443 A1*  7/2015  Jung .................... H04B 7/0617
                                                              370/329
2016/0234281 A1*  8/2016  Padmanabhan ....... H04W 4/029
(Continued)

FOREIGN PATENT DOCUMENTS

EP       2555569 A1    2/2013
WO    2015093559 A1    6/2015

OTHER PUBLICATIONS

Doff, WA., et al., "Sensor Assisted Movement Identification and Prediction for Beamformed 60 GHz Links", 2015 12th Annual IEEE Consumer Communications and Networking Conference (CCNC), Jan. 9, 2015, pp. 1-6, IEEE.
(Continued)

*Primary Examiner* — Dac V Ha
(74) *Attorney, Agent, or Firm* — Coats & Bennett, PLLC (57) ABSTRACT

A radio network node (12) is configured to serve a wireless device (14) in a wireless communication system (10). The radio network node (12) in this regard is configured to determine that the wireless device (14) is onboard a public transit vehicle (16). Based on that determination, the radio network node (12) is configured to predict a position of the public transit vehicle (16), e.g., based on a route schedule (20) of the public transit vehicle (16) and/or positioning measurements (22) received from the public transit vehicle (16). The radio network node (12) is further configured to control beamforming for the wireless device (14) based on the predicted position of the public transit vehicle (16). In some embodiments, this controlling comprises performing dynamic beam direction adjustment, as needed to track the vehicle (16)'s movement. Alternatively or additionally, the controlling comprises performing beam selection from among a subset of candidate beams with coverage in a vicinity of the vehicle (16)'s predicted position.

20 Claims, 8 Drawing Sheets

(51) Int. Cl.
*H04W 4/029* (2018.01)
*G08G 1/123* (2006.01)

(56) References Cited

U.S. PATENT DOCUMENTS

2016/0269964 A1     9/2016  Murray
2016/0323756 A1    11/2016  Shen et al.
2019/0037529 A1*    1/2019  Edge ...................... H04L 5/005
2019/0053191 A1*    2/2019  Balappanavar ....... H04W 4/026

OTHER PUBLICATIONS

Capone, A., et al., "Context Information for Fast Cell Discovery in mm-wave 5G Networks", Proceedings of 21th European Wireless Conference; Budapest, Hungary, Jan. 1, 2015, pp. 1-6, Cornell University.

\* cited by examiner

BEAMFORMING IN A WIRELESS COMMUNICATION SYSTEM

TECHNICAL FIELD

The present application relates generally to methods and apparatus in a wireless communication system, and particularly methods and apparatus for beamforming in a wireless communication system.

BACKGROUND

A transmitter employs beamforming in order to amplify transmitted signals in selected directions, while weakening them in others. To beamform, the transmitter transmits a signal from multiple transmit antennas, but with individually adjusted phase shifts or time delays. This effectively creates a beam in the resulting transmit radiation pattern of the signal—e.g., through controlled constructive and destructive interference of the phase-shifted signals from individual antenna elements. The beam direction depends on the phase shifts of the antenna elements. Correspondingly, a receiver employs beamforming in order to amplify signals received from selected directions while weakening unwanted signals in other directions. The receiver does so by using phase shifts between antenna elements to steer the maximal antenna sensitivity toward a desired direction.

To support base station beamforming, a base station in some approaches deploys multiple beams that fixedly point in respective directions. When the base station transmits data to a user equipment (UE) on one of those beams, the base station constantly evaluates the quality of the data transmission. When the quality degrades to the point of being below an unacceptable threshold, the base station triggers a process to switch the data transmission onto a different one of the beams.

Towards this end, the base station identifies a set of beams as being candidates for switching the data transmission onto. The base station identifies this set as including those beams (from the base station or any neighboring base station) which provide coverage in the vicinity of the UE's last known position. An activation table at the base station may for instance map UE position to relevant candidate beams. The base station then instructs the UE to measure reference signals that are respectively transmitted on the candidate beams in the set. The base station uses the measurement results to decide which beam to switch the data transmission onto. This conventional beam tracking approach thereby switches between different beams "reactively", responsive to quality degradation and based on a UE's current position.

SUMMARY

One or more embodiments herein control beamforming for a wireless device based on predictive positioning of a public transit vehicle in which the wireless device is located. Some embodiments, for example, dynamically adjust the direction of a beam serving the device based on the vehicle's predicted position, as needed for the beam's direction to proactively track movement of the public transit vehicle. Other embodiments select a beam to serve the device, from a subset of candidate beams with coverage in a vicinity of the vehicle's predicted position.

More particularly, embodiments herein include a method performed by a radio network node serving a wireless device in a wireless communication system. The method includes determining that the wireless device is onboard a public transit vehicle. The method also entails, based on that determining, predicting a position of the public transit vehicle, e.g., based on a route schedule of the public transit vehicle and/or positioning measurements received from the public transit vehicle. The method further includes controlling beamforming for the wireless device based on the predicted position of the public transit vehicle. In some embodiments, this controlling comprises dynamically adjusting a direction of a beam on which the radio network node transmits to or receives from the wireless device, as needed for the direction of the beam to track movement of the public transit vehicle. Alternatively or additionally, the controlling comprises selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

In some embodiments, the prediction entails predicting a position of the public transit vehicle based on the route schedule of the public transit vehicle. In this case, the prediction may be performed by determining a position at which the route schedule indicates the public transit vehicle will be at a particular time in the future, and then predicting a position at which the public transit vehicle will be at the particular time in the future, based on the determined position.

Alternatively or additionally, the prediction may involve predicting a position of the public transit vehicle based on positioning measurements received from the public transit vehicle. In this and other embodiments, for example, predicting a position of the public transit vehicle at a future time may entail extrapolating a position of the public transit vehicle as indicated by a positioning measurement received from the public transit vehicle, using a speed vector obtained for the public transit vehicle. In fact, in one embodiment, a position of the public transit vehicle at a future time $t_2$ is predicted as $$P_{t_2} = P_{t_1} + \text{speed} \cdot t_2 + \text{acceleration} \cdot \frac{t_2^2}{2},$$

where $P_{t_1}$ is the position of the public transit vehicle at a time $t_1$, speed is a speed vector obtained for the public transit vehicle, and acceleration is an acceleration vector obtained for the public transit vehicle.

In any event, the radio network node in some embodiments determines that the wireless device is onboard the public transit vehicle by identifying that the wireless device moves in sync with the public transit vehicle. In one embodiment, for example, this determination may include determining that the wireless device is onboard the public transit vehicle comprises determining a coarse trajectory of the wireless device using beam tracking and matching the coarse trajectory of the wireless device with an estimated or predicted trajectory of the public transit vehicle. In other embodiments, by contrast, determination may be performed based on receiving information indicating detection of the wireless device by a device onboard the public transit vehicle.

In some embodiments, prediction involves predicting a position of the public transit vehicle based on the route schedule of the public transit vehicle and/or positioning measurements received from the public transit vehicle. In this case, beam control may entail adjusting the direction of the beam to point towards the predicted position of the public transit vehicle.

In one or more embodiments, a table accessible by the radio network node maps candidate device positions within a coverage area of the radio network node to candidate beams in the set. In this case, the subset of candidate beams may be identified by identifying to which of the candidate beams the table maps positions within a defined vicinity of the predicted position of the public transit vehicle.

In some embodiments, the radio network node receives from the wireless device a measurement report indicating a received quality of a reference signal transmitted on the beam. In this case, the radio network node may select a beam on which to transmit to or receive from the wireless device, responsive to the received quality being below a defined threshold.

Embodiments herein also include a radio network node configured to serve a wireless device in a wireless communication system. The radio network node is configured to determine that the wireless device is onboard a public transit vehicle. The radio network node is also configured to, based on determining that the wireless device is onboard the public transit vehicle, predict a position of the public transit vehicle, e.g., based on a route schedule of the public transit vehicle and/or positioning measurements received from the public transit vehicle. The radio network node is further configured to control beamforming for the wireless device based on the predicted position of the public transit vehicle. The radio network node may do so by dynamically adjusting a direction of a beam on which the radio network node transmits to or receives from the wireless device, as needed for the direction of the beam to track movement of the public transit vehicle. Alternatively or additionally, the radio network node may do so by selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

Embodiments further include a radio network node configured to serve a wireless device in a wireless communication system. The radio network node comprises a determining module for determining that the wireless device is onboard a public transit vehicle. The radio network node further includes a predicting module for, based on determining that the wireless device is onboard the public transit vehicle, predicting a position of the public transit vehicle, e.g., based on a route schedule of the public transit vehicle and/or positioning measurements received from the public transit vehicle. The radio network node also comprises a beam controlling module for controlling beamforming for the wireless device based on the predicted position of the public transit vehicle. This controlling may comprise dynamically adjusting a direction of a beam on which the radio network node transmits to or receives from the wireless device, as needed for the direction of the beam to track movement of the public transit vehicle. Alternatively or additionally, this controlling may comprise selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

Embodiments moreover include a radio network node configured to serve a wireless device in a wireless communication system. The radio network node comprises processing circuitry and a memory. The memory contains instructions executable by the processing circuitry whereby the radio network node is configured to: determine that the wireless device is onboard a public transit vehicle; based on determining that the wireless device is onboard the public transit vehicle, predict a position of the public transit vehicle, e.g., based on a route schedule of the public transit vehicle and/or positioning measurements received from the public transit vehicle; and control beamforming for the wireless device based on the predicted position of the public transit vehicle. The radio network node may do so by dynamically adjusting a direction of a beam on which the radio network node transmits to or receives from the wireless device, as needed for the direction of the beam to track movement of the public transit vehicle. Alternatively or additionally, the radio network node may do so by selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

Embodiments herein also include a computer program comprising instructions which, when executed by at least one processor of a radio network node, causes the radio network node to perform the method of any of the above embodiments. Embodiments further include a carrier containing such a computer program. The carrier may be one of an electronic signal, optical signal, radio signal, or computer readable storage medium.

At least some embodiments herein prove advantageous in that they minimize or reduce control signaling on the radio interface. For example, a wireless device in some embodiments need not transmit positioning measurements themselves. Moreover, to the extent control signaling is required from the public transit vehicle (e.g., in the form of positioning measurements), that control signaling may advantageously be common for wireless device(s) determined to be onboard the vehicle. This may translate into improved spectrum utilization as well as improved device energy consumption (due to reductions in non-data-related transmissions and receptions).

Alternatively or additionally, some embodiments herein prove advantageous in that they maintain a substantially constant and high quality service channel for moving device(s) onboard a public transit vehicle. Some embodiments for instance reduce the frequency and/or level of periodic channel degradation in this way by increasing the quality of the channel for the device(s) both in terms of bandwidth and reduced packet loss. Still other embodiments herein advantageously conserve scarce computational and radio resources by transmitting fewer reference signals on fewer candidate beams, and improve energy efficiency of the wireless device(s) since those devices need to receive and measure fewer signals.

DETAILED DESCRIPTION

Figure 1:
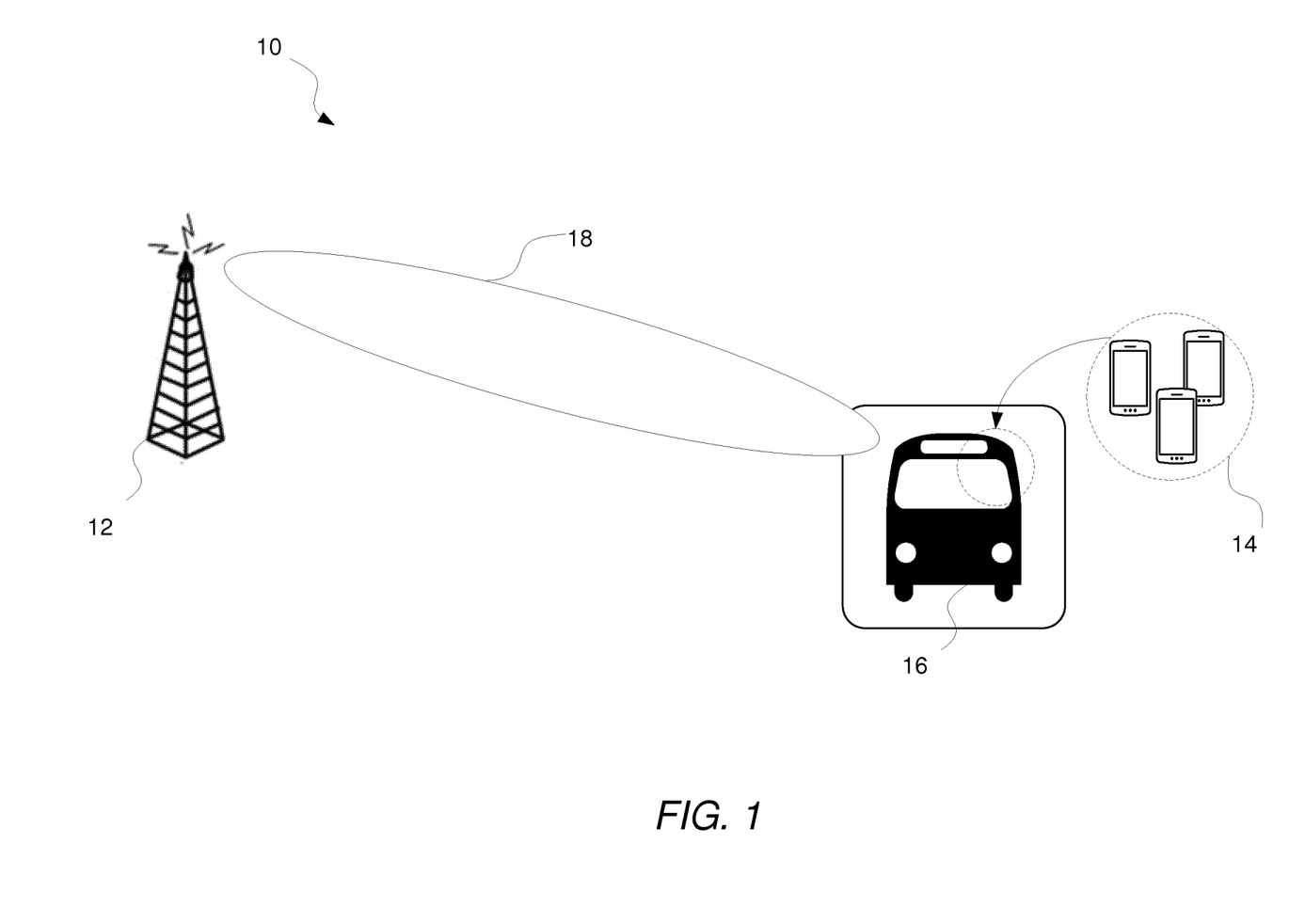
FIG. 1 is a block diagram of a wireless communication system according to one or more embodiments.

FIG. 1 shows a wireless communication system 10 according to some embodiments. The system 10 includes a radio network node 12 such as a base station or other network equipment. The system 10 also includes one or more wireless devices 14, e.g., user equipment (UE). The radio network node 12 is configured to serve the one or more wireless devices 14 by transmitting radio signals to or receiving radio signals from those devices 14.

The one or more wireless devices 14 as shown in FIG. 1 are onboard a public transit vehicle 16, such as a bus, train, subway, or other shared passenger transport vehicle. The radio network node 12 advantageously exploits its knowledge that the wireless device(s) 14 are onboard such a public transit vehicle 16, as well as its knowledge about the vehicle's movement, in order to control beamforming for those wireless device(s) 14. The radio network node 12 may for instance control the direction and/or selection of a beam 18 on which radio signals are transmitted to or received from the wireless device(s) 14 in the public transit vehicle 16. In embodiments where radio signals are transmitted to or received from a wireless device 14 on a beam 18 specific to or otherwise dedicated for that wireless device 14, the radio network node 12 may control beam direction and/or selection separately for different devices, even for devices in the same public transit vehicle 16. In this case, different devices' beams may spatially overlap in full or in part (e.g., if the public transit vehicle is small, such as a taxi) or may not overlap at all (e.g., for devices at different ends of a train).

Figure 2:
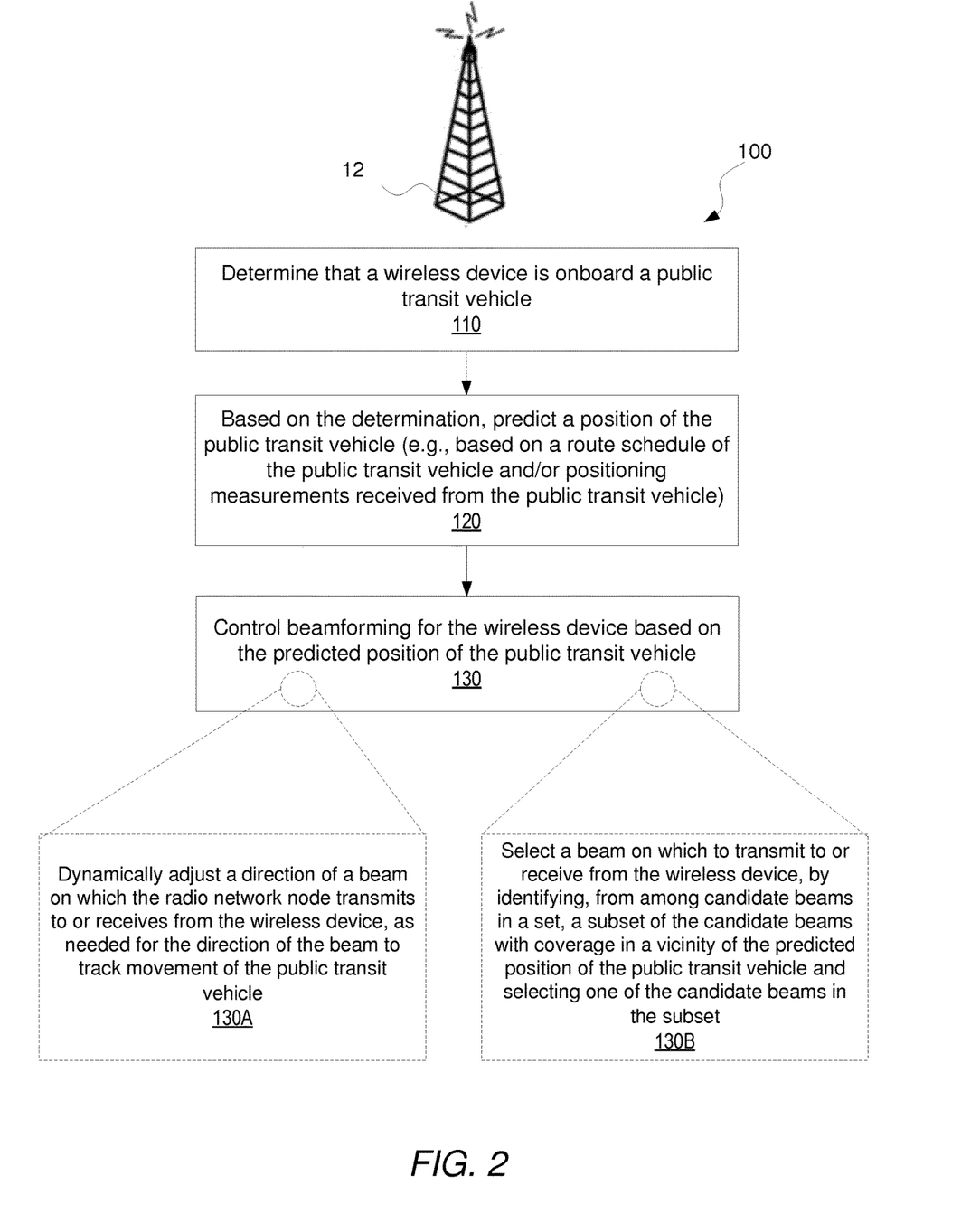
FIG. 2 is a logic flow diagram of a method performed by a radio network node according to some embodiments.

FIG. 2 illustrates a method 100 performed by the radio network node 12 according to one or more embodiments. As shown, the method 100 includes the radio network node 12 determining that a wireless device 14 is onboard a public transit vehicle 16 (Block 110). The method 100 also entails the radio network node 12, responsive to that determination, predicting a position of the public transit vehicle 16 (Block 120). As explained more fully below, for instance, the radio network node 12 may predict the vehicle's position based on the vehicle's route schedule and/or positioning measurements received from the vehicle 16. Regardless, the method 100 further includes the radio network node 12 controlling beamforming for the wireless device 14 based on the predicted position of the public transit vehicle 16 (Block 130).

In some embodiments, for example, the radio network node 12 controls beamforming in this way by controlling the direction of the beam 18 on which the radio network node 12 transmits to or receives from the wireless device 14, based on the vehicle's predicted position. This may entail for instance dynamically adjusting the beam's direction, as needed for the beam's direction to track movement of the public transit vehicle 16 (Block 130A in FIG. 2). The dynamic nature of this beam tracking means that the beam's direction adjusts as the vehicle 16 moves, e.g., in a substantially continuous or quick periodic fashion, so that the vehicle 16 remains in focus of the beam 18. In fact, in some embodiments, the radio network node 12 dynamically adjusts the beam's direction as needed for the beam to continue to provide substantially optimal coverage to the device(s) 14 as the vehicle 16 moves. In this case, then, the radio network node 12 adjusts the beam's direction in a proactive or preemptive manner, before coverage provided by the beam to the device(s) 14 meaningfully degrades (e.g., beyond a threshold defining optimal coverage). The beam direction adjustment may for instance be prompted or otherwise triggered by predicted movement of the vehicle 16 in which the device(s) 14 are located, rather than degradation of the quality of the radio network node's connection with the device(s) 14. The rate at which beam direction adjustment is performed may be varied in proportion to a measured, estimated, or predicted rate at which the vehicle 16 moves (e.g., in terms of velocity or speed).

Figure 3:
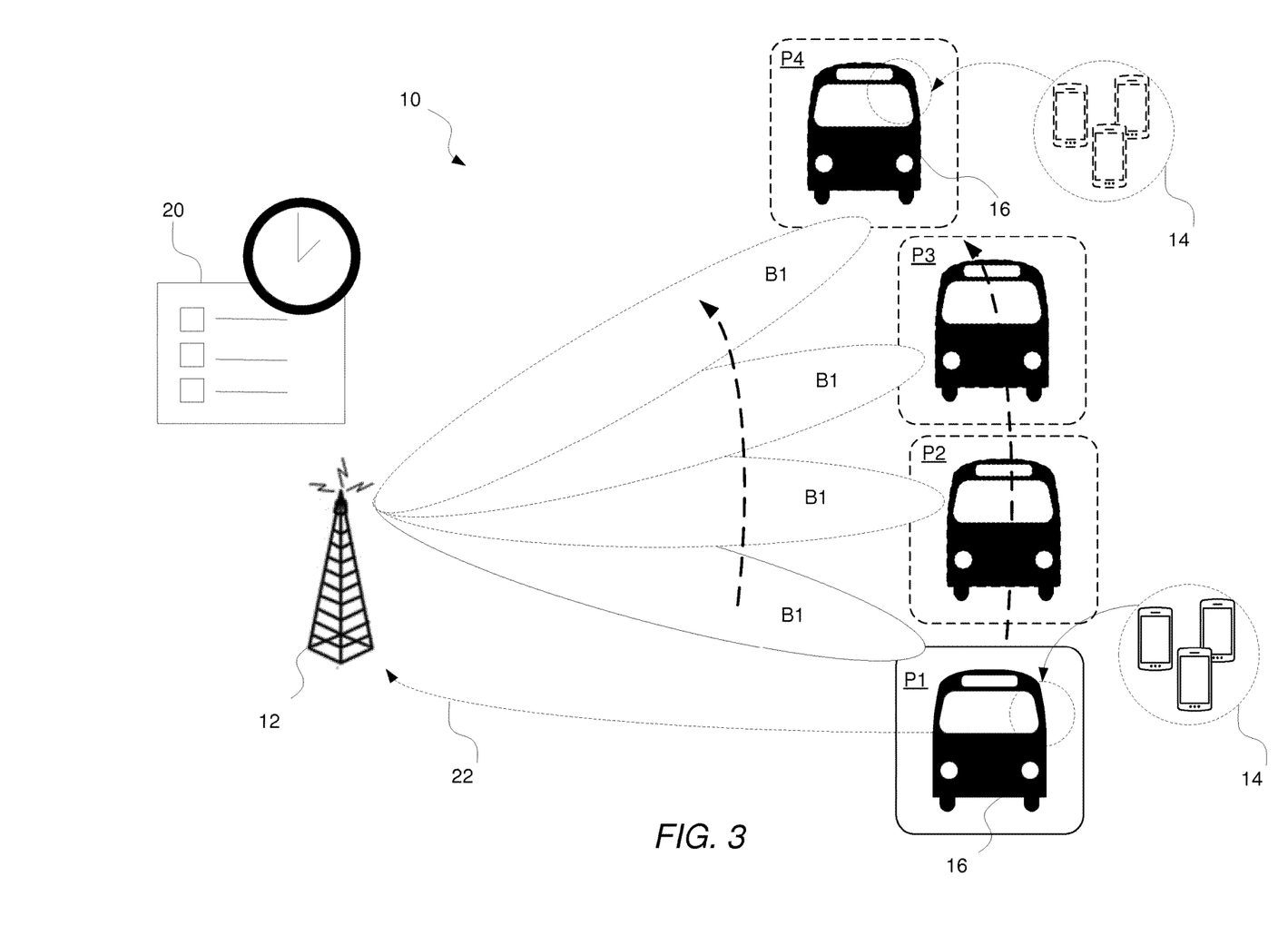
FIG. 3 is a block diagram illustrating dynamic adjustment of beam direction according to some embodiments.

FIG. 3 illustrates an example according to one or more of these embodiments. As shown, the radio network node 12 determines that a wireless device 14 is onboard a public transit vehicle 16. Responsive to or otherwise based on this determination, the radio network node 12 may switch from performing beam tracking based on reactive positioning of the device 14 to performing dynamic beam tracking based on predictive positioning of the public transit vehicle 16 in which the device 14 is located.

For example, in some embodiments, the radio network node 12 as shown in FIG. 3 obtains a route schedule 20 of the public transit vehicle 16 (e.g., a bus or train route schedule). This route schedule 20 is an itinerary or timetable detailing where the public transit vehicle 16 is scheduled to be positioned at certain times of the day. The route schedule 20 may be substantially static in some embodiments, but in other embodiments may be dynamically updated as schedule changes are made. Whether the route schedule 20 is substantially static or dynamically updatable, though, the radio network node 12 is configured in these embodiments to consult the schedule 20 to determine a position at which the route schedule 20 indicates the vehicle 16 will be at a particular time in the future, and to predict the vehicle's position at that particular time based on that determined position.

Alternatively or additionally, the radio network node 12 as shown in FIG. 3 may receive positioning measurements 22 from the public transit vehicle 16; that is, from one or more transmitters with which the vehicle 16 itself is equipped. The positioning measurements 22 may include for instance Global Positioning System (GPS) measurements by a GPS system on-board the public transit vehicle 16 (e.g., with centimeter precision accuracy), triangulation measurements based on the signal strength of multiple radio network nodes, or any other measurement which directly or indirectly indicates a position at which the vehicle 16 is or was located. Even though the positioning measurements themselves indicate a position at which the vehicle 16 is or was located, as opposed to a position at which the vehicle 16 will be located in the future, the radio network node 12 in some embodiments is configured to predict the vehicle's position at a future time using the vehicle's position as indicated by the positioning measurements and other information about the vehicle's path of movement. The radio network node 12 may for instance predict the vehicle's position at a future time, by using the vehicle's speed vector to extrapolate or otherwise derive the vehicle's (current) position as indicated by the positioning measurements. As one particular example in this regard, the radio network node 12 may predict the position of the public transit vehicle 16 at a future time $t_2$ as $P_{t_2} = P_{t_1} + \text{speed} \cdot t_2$, where $P_{t_1}$ is the position of the public transit vehicle at a time $t_1$, and speed is a speed vector obtained for the public transit vehicle 16. In another example, the radio network node 12 may also use the vehicle's acceleration vector for position prediction. The radio network node 12 may for instance predict the vehicle's position at a future time $t_2$ as $$P_{t_2} = P_{t_1} + \text{speed} \cdot t_2 + \text{acceleration} \cdot \frac{t_2^2}{2},$$

where acceleration is an acceleration vector obtained for the public transit vehicle 16. Taking further derivatives of position beyond the second (acceleration) may not yield improved prediction accuracy, since those further derivatives can sharply change in a stochastic manner (e.g., a driver presses or releases the gas or brake pedal).

In some embodiments, the radio network node 12 predicts the vehicle's position using both the route schedule 20 and positioning measurements 22. The radio network node 12 may for instance tune or otherwise adjust the way that it predicts vehicle position using the route schedule 20, based on an extent to which positioning measurements 22 indicate the vehicle 16 is following that schedule 20. The radio network node 12 in one embodiment, for example, predicts the vehicle's position as being behind or ahead of the schedule 20, based on comparing scheduled vehicle positions to actual vehicle positions indicated by the positioning measurements 22.

No matter whether prediction is performed based on the route schedule 20 and/or positioning measurements 22, the prediction advantageously minimizes control signaling on the radio interface. Indeed, the wireless device(s) 14 onboard the public transit vehicle 16 need not transmit positioning measurements themselves, especially since those measurements would be needlessly redundant for devices 14 in substantially the same location (i.e., on the vehicle). Moreover, to the extent control signaling is required from the vehicle 16 (e.g., in the form of positioning measurements 22), that control signaling is advantageously common for the one or more wireless devices 14 determined to be onboard the vehicle 16. This translates into improved spectrum utilization as well as improved device energy consumption (due to reductions in non-data-related transmissions and receptions).

In any event, FIG. 3 shows that the radio network node 12 transmits to or receives from the one or more wireless devices 14 on a particular beam B1 when the vehicle 16 is located at position P1, e.g., at time t1. Meanwhile, the radio network node 12 uses the route schedule 20 and/or positioning measurements 22 to predict that the vehicle will move from position P1 to position P2, e.g., at a future time t2. Based on this prediction, the radio network node 12 dynamically adjusts the direction of the particular beam B1, as needed for the beam's direction to track movement of the vehicle 16 (from position P1 to position P2). In some embodiments, for instance, the radio network node 12 adjusts the beam's direction so that it will point towards the predicted position P2 of the vehicle 16 at the future time t2 at which the vehicle 16 is predicted to be located there.

The radio network node 12 may even do so proactively, before the quality of the connection to the device(s) 14 degrades below a level deemed optimal. In this case, therefore, the radio network node 12 may re-direct the beam B1 when the position prediction warrants a pointing direction change that meets or exceeds a defined threshold, irrespective of the connection quality level as long as the connection quality is above a minimum quality threshold. Accordingly, in this and other embodiments, the radio network node 12 performs beamforming as needed to maintain a substantially constant and high quality service channel for moving device(s) 14 onboard the vehicle 16. Some embodiments for instance reduce the frequency and/or level of periodic channel degradation in this way by increasing the quality of the channel for the device(s) 14 both in terms of bandwidth and reduced packet loss. Moreover, communication with the device(s) 14 need not be temporarily interrupted as no beam switching need be performed. Even if beam switching is still performed for inter-node handovers, the reduced frequency of beam switching translates into improved user satisfaction and improved spectral efficiency.

The radio network node 12 performs this beam re-direction process (e.g., continuously) as the vehicle 16 is predicted to move from position P2 to position P3, from position P3 to position P4, etc., meaning that the radio network node 12 effectively sweeps beam B1's pointing direction as shown in FIG. 3. In this way, rather than or in addition to using static beams pointing to fixed directions, the radio network node 12 dynamically adjusts beam B1's focus to point from direction to direction so as to proactively sync with the vehicle's predicted movements.

Note that, in at least some embodiments, the radio network node 12 still triggers a beam selection or switch process responsive to the connection quality on the dynamically adjusted beam B1 falling below a defined threshold. A beam switch may result in switching from beam B1 to a different beam provided by a different base station (not shown). Accordingly, in one embodiment, the radio network node 12 generally adjusts the direction of a beam that it provides itself, as needed to track the vehicle as it moves within the radio network node's coverage area, but triggers a switch to a beam provided by a different radio network node 12 as the vehicle approaches the fringes of that coverage area.

In other embodiments, the radio network node 12 alternatively or additionally controls beamforming by controlling beam selection based on the predicted position of the vehicle 16. In these embodiments, the method 100 in FIG. 2 may entail identifying, from among candidate beams in a set, a subset of the candidate beams with coverage in a vicinity of the predicted position of the public transit vehicle 16 (Block 130B). The method 100 may then include selecting one of the candidate beams in the subset. In embodiments where the candidate beams have different coverage areas that are substantially fixed, this selection may be performed periodically or occasionally as the device 14 moves so as to track the device's movement with selection of different beams. In other embodiments, though, the candidate beams' directions may be dynamically adjustable as described above, in which case such selection may just be performed initially to choose a beam with a certain starting direction.

Figure 4:
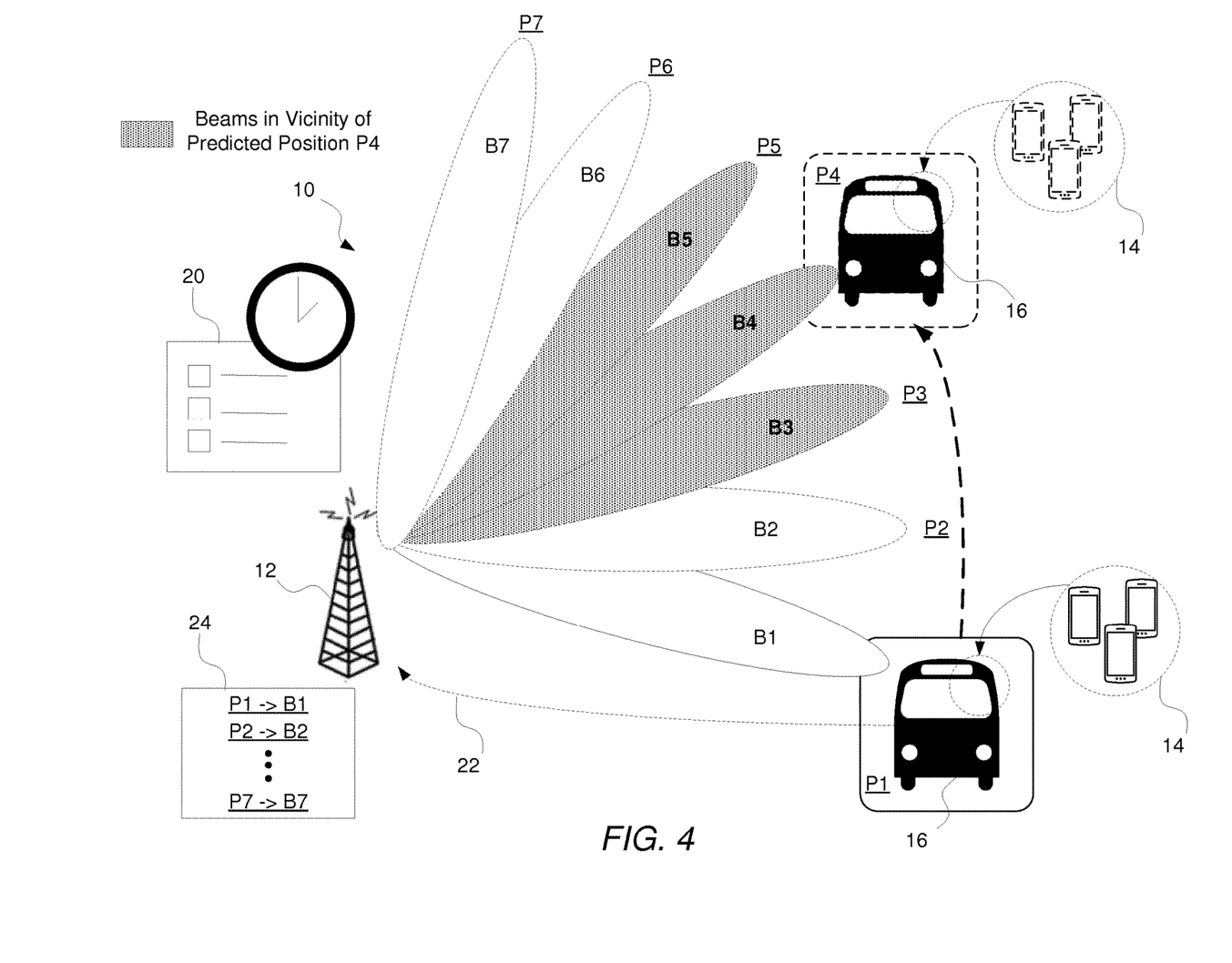
FIG. 4 is a block diagram illustrating beam selection according to some embodiments.

In more detail, FIG. 4 shows that the radio network node 12 includes a set of multiple candidate beams B1-B7 within the radio network node's coverage area. The radio network node 12 transmits to or receives from the one or more onboard wireless devices 14 on beam B1 when the vehicle 16 is located at position P1, e.g., at time t1. Meanwhile, as described with respect to FIG. 3, the radio network node 12 uses the route schedule 20 and/or positioning measurements 22 to predict that the vehicle 16 will move from position P1 to position P4, e.g., at a future time t4. The radio network node 12 exploits this prediction in deciding which, if any, of the multiple candidate beams B1-B7 to switch to in order to continue transmitting to or receiving from the wireless device(s) 14 at that future time t4

In some embodiments, for example, the radio network node 12 identifies, from among the candidate beams B1-B7 in the set, a subset of those candidate beams which provide coverage in a vicinity of the predicted position P4 of the vehicle 16, e.g., as defined by a vicinity threshold. According to the example in FIG. 4, for instance, the radio network node 12 identifies a subset that includes candidate beams B3, B4, and B5 which provide coverage in a vicinity of the vehicle's predicted position P4. In this way, the radio network node 12 effectively reduces the number of beams that it considers as actual candidates for selection down to only those candidate beams that provide coverage in the vicinity of the vehicle's predicted position P4. The radio network node 12 is able to do this by exploiting knowledge of the vehicle's (and thereby the device's) direction of movement, since otherwise the radio network node 12 would have to consider beams covering any possible direction of movement. Having identified this subset of candidate beams, the radio network node 12 selects a candidate beam in the subset (e.g., beam B3, B4, and/or B5) as being a beam on which the radio network node 12 transmits to or receive from the wireless device(s) 14 at the future time t4.

In some embodiments, the radio network node 12 identifies the subset using a mapping table 24 that is stored or otherwise accessible at the radio network node 12. This mapping table 24 maps candidate device positions P1, P2, . . . P7 within the radio network node's coverage area to candidate beams B1, B2, . . . B7 in the set. The radio network node 12 accordingly identifies the subset of candidate beams B3, B4, and B5 by identifying to which of the candidate beams the table 24 maps positions within a defined vicinity of the predicted position P4 of the vehicle 16. For example, the radio network node 12 may first identify candidate beam B4 as being the beam to which the table 24 maps the vehicle's predicted position P4. The radio network node 12 may then identify candidate beams B3 and B5 as providing coverage within a defined vicinity of that provided by candidate beam B4.

The radio network node 12 may exclusively evaluate the candidate beams B3, B4, and B5 in the subset, i.e., to the exclusion of other candidate beams B1, B2, B6, and B7 that are not in the subset because they do not provide coverage in a vicinity of the vehicle's predicted position P4. Evaluation of a candidate beam in this regard may involve the radio network node transmitting a reference signal on that candidate beam, receiving a result of a measurement that a wireless device 14 performs on the reference signal, and comparing the received result to one or more measurement results received for one or more other candidate beams in the subset. The radio network node 12 may for instance choose the candidate beam in the subset whose reported measurement result indicates the best connection quality. In this case, then, by identifying a subset that is smaller than the full set of candidate beams within the radio network node's coverage area, the radio network node 12 advantageously conserves scarce computational and radio resources because it transmits fewer reference signals on fewer candidate beams, and improves energy efficiency of the wireless device(s) 14 since those devices need to receive and measure fewer signals.

Note that in at least some embodiments the set of candidate beams, and the identified subset, may include candidate beams provided by one or more base stations. That is, beam selection may result in a switch from one base station to another base station.

Figure 5:
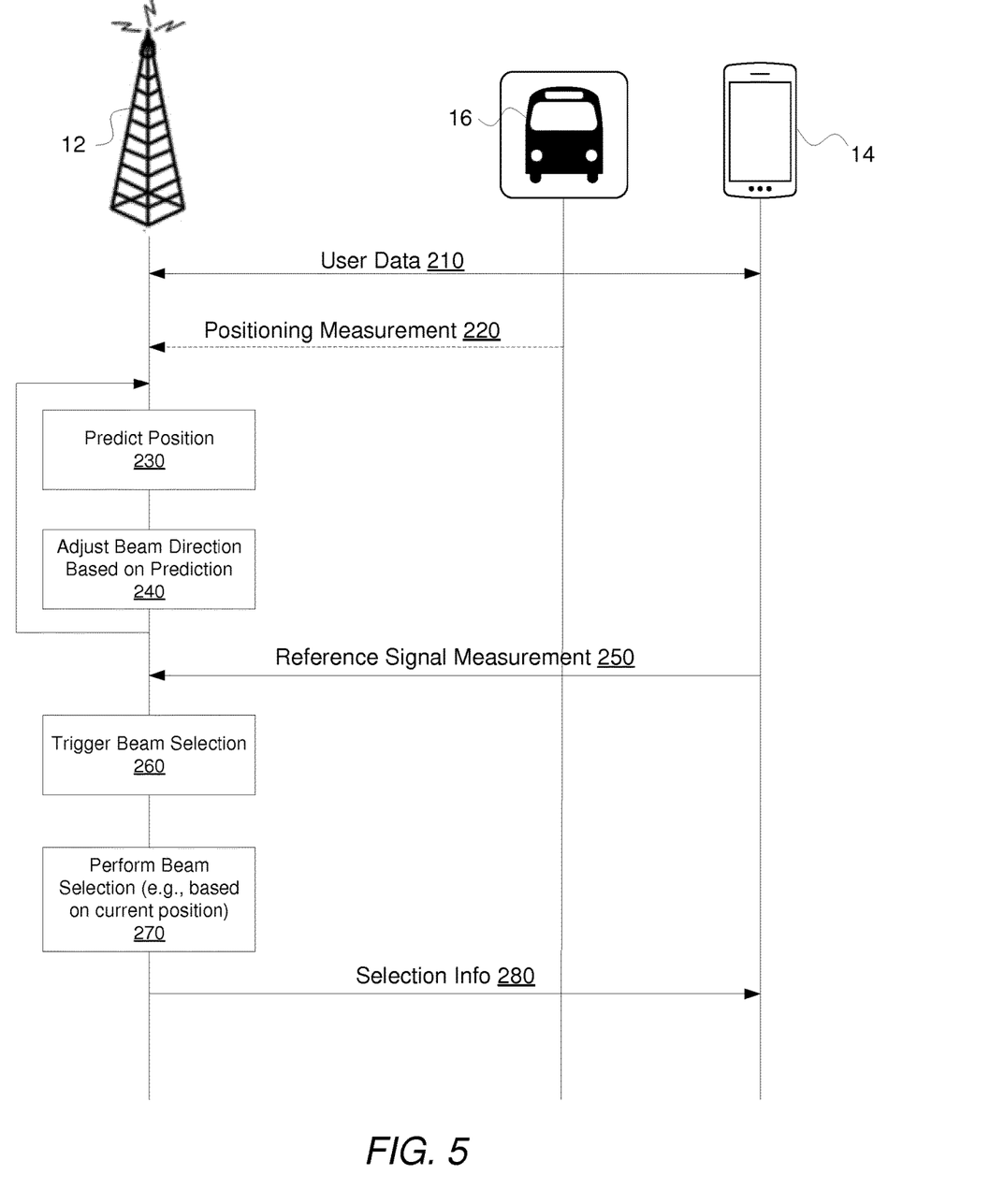
FIG. 5 is a call flow diagram illustrating processing performed for dynamic adjustment of beam direction according to some embodiments.

Also note that the beam control approaches described above in FIGS. 3 and 4 may be implemented separately or in combination. FIG. 5 for instance illustrates one example where the beam control approach illustrated in FIG. 3 is implemented without the beam control approach illustrated in FIG. 4.

As shown in FIG. 5, the radio network node 12 transmits and/or receives user data 210 from a wireless device 14 onboard a public transit vehicle 16. The radio network node 12 transmits and/or receives the user data on a particular beam. While the radio network node 12 serves the wireless device 14 in this way, the radio network node 12 occasionally or periodically adjusts the particular beam's direction as needed to track the vehicle's movement. In particular, the radio network node 12 predicts the vehicle's position 230, e.g., based on a route schedule and/or positioning measurement(s) 220 for the vehicle 16. The radio network node 12 then adjusts 240 the beam's direction based on that prediction, e.g., so that the beam points toward the vehicle's predicted position at a certain time.

In the meantime, though, the wireless device 14 may provide one or more reference signal measurements 250 to the radio network node 12 indicating a quality of the connection on the beam. The radio network node 12 may trigger beam selection 260 when the reference signal measurement(s) 250 meet one or more defined criteria, e.g., when the reference signal measurement(s) 250 indicate the (time averaged) connection quality level on the beam has fallen below a defined threshold. In any event, with beam selection triggered at 260, the radio network node may then perform beam selection 270. This beam selection may or may not be performed based on predictive positioning as described herein. In fact, in one embodiment, beam selection 270 may be performed based on a current position of the vehicle 16 or of the wireless device 14 itself. In particular, beam selection 270 may involve transmitting reference signals on respective candidate beams providing coverage near the device's current position, receiving results of measurements performed on those reference signals, and selecting between the candidate beams based on comparing the received results. The radio network node 12 upon selecting a new beam (which may be provided by the radio network node 12 itself or a different radio network node) sends selection information 280 to the wireless device 14. The selection information may for instance indicate an identifier for the newly selected beam.

Figure 6:
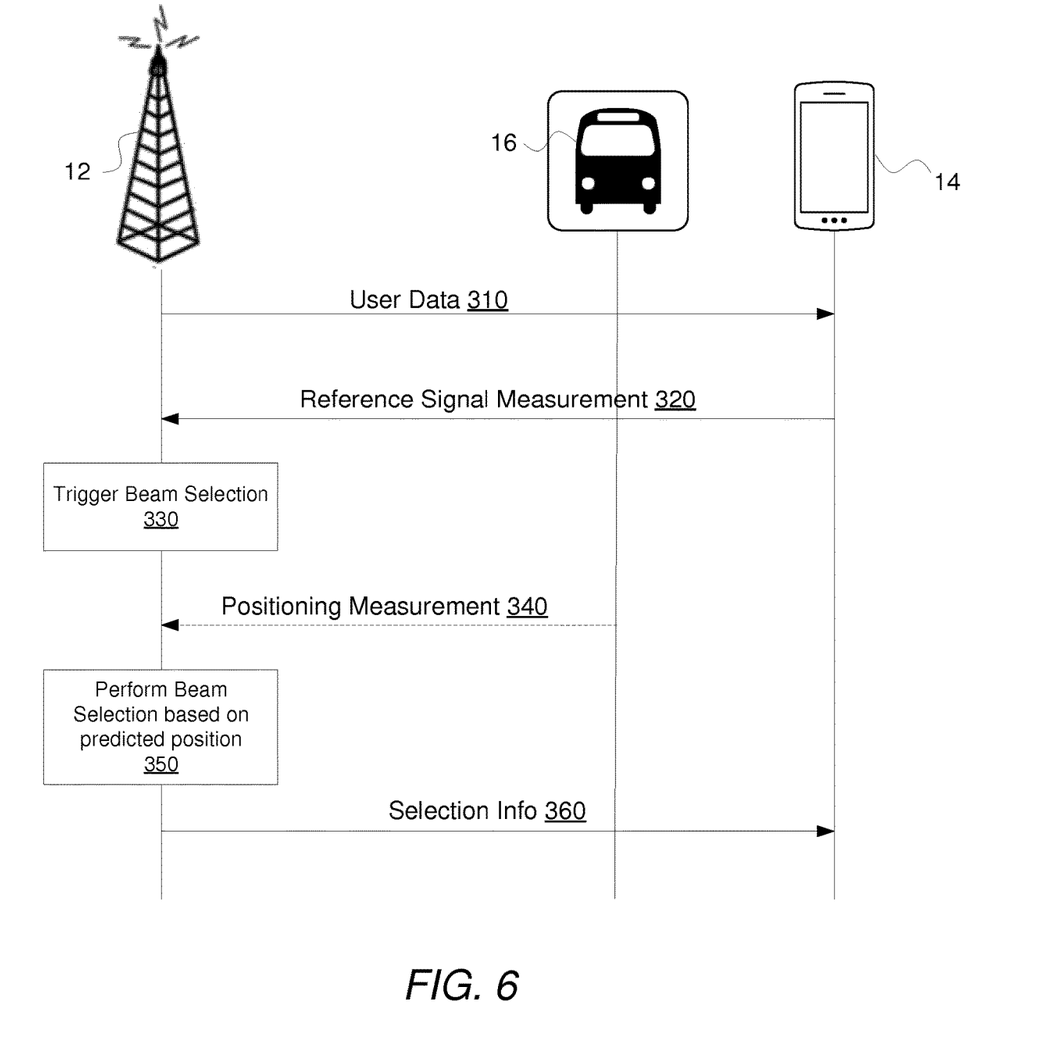
FIG. 6 is a call flow diagram illustrating processing performed for beam selection according to some embodiments.

FIG. 6 by contrast illustrates a different example where the beam control approach illustrated in FIG. 4 is implemented without the beam control approach illustrated in FIG. 3. As shown, the radio network node 12 transmits and/or receives user data 310 from a wireless device 14 onboard a public transit vehicle 16. The radio network node 12 transmits and/or receives the user data on a particular beam. While the radio network node 12 serves the wireless device 14 in this way, the wireless device 14 may provide one or more reference signal measurements 320 to the radio network node 12 indicating a quality of the connection on the beam. The radio network node 12 may trigger beam selection 330 when the reference signal measurement(s) 320 meet one or more defined criteria, e.g., when the reference signal measurement(s) 320 indicate the (time averaged) connection quality level on the beam has fallen below a defined threshold. In any event, with beam selection triggered at 330, the radio network node may then perform beam selection 350. This beam selection 350 as shown is performed based on predictive positioning as described herein. In particular, the radio network node 12 predicts the vehicle's position, e.g., based on a route schedule and/or positioning measurement(s) 340 for the vehicle 16. The radio network node 12 then identifies a subset of its candidate beams which provide coverage in a vicinity of the vehicle's predicted position and then selects a candidate beam from that subset. The radio network node 12 upon selecting a new beam sends selection information 360 to the wireless device 14. The selection information may for instance indicate an identifier for the newly selected beam.

Figure 7:
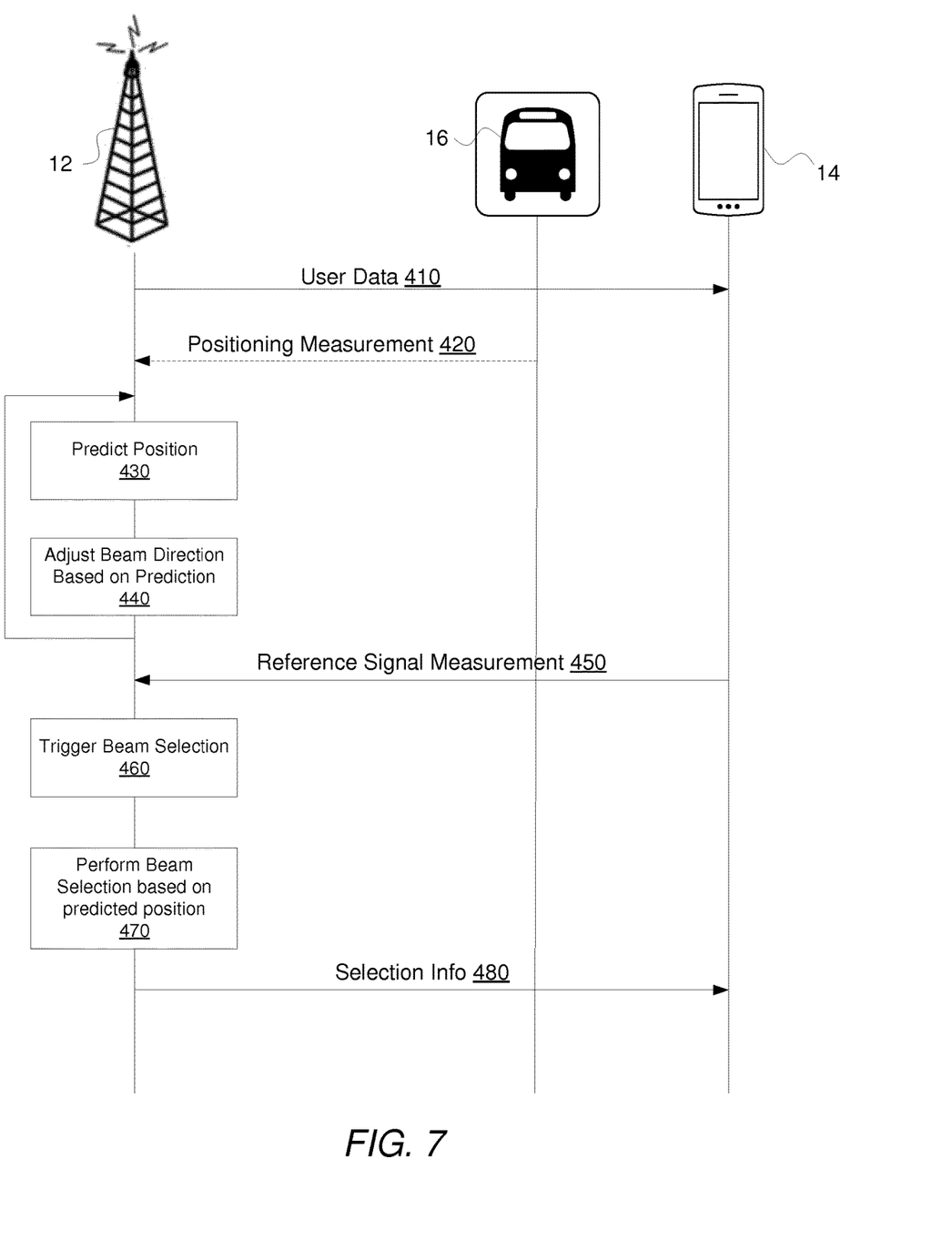
FIG. 7 is a call flow diagram illustrating processing performed for both dynamic beam adjustment and beam selection in combination according to some embodiments.

FIG. 7 illustrates still another example where the beam control approaches in FIGS. 3 and 4 are implemented in combination. In this case, the radio network node 12 transmits and/or receives user data 410 from a wireless device 14 onboard a public transit vehicle 16. The radio network node 12 transmits and/or receives the user data on a particular beam. While the radio network node 12 serves the wireless device 14 in this way, the radio network node 12 occasionally or periodically adjusts the particular beam's direction as needed to track the vehicle's movement. In particular, the radio network node 12 predicts the vehicle's position 430, e.g., based on a route schedule and/or positioning measurement(s) 420 for the vehicle 16. The radio network node 12 then adjusts 440 the beam's direction based on that prediction, e.g., so that the beam points toward the vehicle's predicted position at a certain time.

In the meantime, though, the wireless device 14 may provide one or more reference signal measurements 450 to the radio network node 12 indicating a quality of the connection on the beam. The radio network node 12 may trigger beam selection 460 when the reference signal measurement(s) 450 meet one or more defined criteria, e.g., when the reference signal measurement(s) 450 indicate the (time averaged) connection quality level on the beam has fallen below a defined threshold. In any event, with beam selection triggered at 460, the radio network node may then perform beam selection 470.

This beam selection 470 as shown is performed based on predictive positioning as described herein. In particular, the radio network node 12 predicts the vehicle's position, e.g., based on a route schedule and/or positioning measurement(s) 420 for the vehicle 16. The radio network node 12 then identifies a subset of its candidate beams which provide coverage in a vicinity of the vehicle's predicted position and then selects a candidate beam from that subset. The radio network node 12 upon selecting a new beam sends selection information 480 to the wireless device 14. The selection information may for instance indicate an identifier for the newly selected beam.

In these ways, embodiments herein generally exploit knowledge that one or more wireless device(s) 14 are onboard a public transit vehicle 16 in order to control beamforming for the device(s) 14. Note that the radio network node 12 may determine that the device(s) 14 are onboard a public transit vehicle 16 using any number of mobility analytic approaches. In one embodiment, for example, the radio network node 12 determines that a wireless device 14 is onboard a public transit vehicle 16 by identifying that the device 14 moves in sync with that vehicle 16. The radio network node 12 may for instance compare a trajectory of a wireless device 14 to a trajectory of the public transit vehicle 16, and determines that the device 14 is onboard the vehicle 16 when the device's trajectory matches the vehicle's estimated or predicted trajectory to at least a defined extent.

The radio network node 12 in some embodiments may even obtain the device's trajectory without resort to positioning measurements from the device 14 itself. Indeed, in one embodiment, the radio network node 12 determines a coarse trajectory of the device 14 in space and time, e.g., using conventional beam tracking techniques. This trajectory may be coarse in the sense that it reflects the device's trajectory in terms of beam coverage areas through which the device 14 moves. When the beam coverage areas through which the vehicle 16 moves matches those through which the device 14 moves to a defined extent (e.g., 95% match), the radio network node 12 may deem the device 14 onboard the vehicle 16. In this approach, therefore, the device 14 need not send positioning measurements itself to assist the radio network node 12 in this determination.

Of course, in other embodiments, the radio network node 12 determines that a wireless device 14 is onboard a public transit vehicle 16 with assistance from a (dedicated) detection device onboard the vehicle 16. The detection device may for instance detect when a wireless device 14 is onboard and signal information indicating that detection to the radio network node 12.

Embodiments herein are generally applicable to any type of wireless communication system 10 which employs beamforming. Indeed, embodiments may use any of one or more communication protocols known in the art or that may be developed, such as IEEE 802.xx, CDMA, WCDMA, GSM, LTE, UTRAN, WiMax, or the like. Accordingly, although sometimes described herein in the context of 5G, the principles and concepts discussed herein are applicable to 4G systems and others.

A wireless device is any type device capable of communicating with another radio node wirelessly over radio signals. A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, a "radio network node" refers to network equipment capable, configured, arranged and/or operable to communicate directly or indirectly with a wireless device and/or with other equipment in the wireless communication network that enable and/or provide wireless access to the wireless device. Examples of network equipment include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, a radio network node may represent any suitable device (or group of devices) capable, configured, arranged, and/or operable to enable and/or provide a wireless device access to the wireless communication network or to provide some service to a wireless device that has accessed the wireless communication network. The list above is not intended to express just alternative radio network nodes, but to express various examples of classes of network equipment as well as examples of specific network equipment.

Note that although beams were by necessity illustrated in the figures in one dimensional space, beams herein may have coverage areas that are described in one, two, or three dimensional space. A beam on which the radio network node 12 transmits or received may be referred to generally as a network-beam. That is, a network-beam as used herein may refer to a transmit beam on which the network equipment 12 is configured or capable of transmitting, or a receive beam on which the network equipment 12 is configured or capable of receiving.

Although a signal has been referred to as being transmitted "on" a beam, a signal may in other senses be said to be transmitted "in" or "over" a beam.

In view of the above variations and modifications, a radio network node 12 as described above may perform any of the processing herein by implementing any functional means or units. In one embodiment, for example, the radio network node 12 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
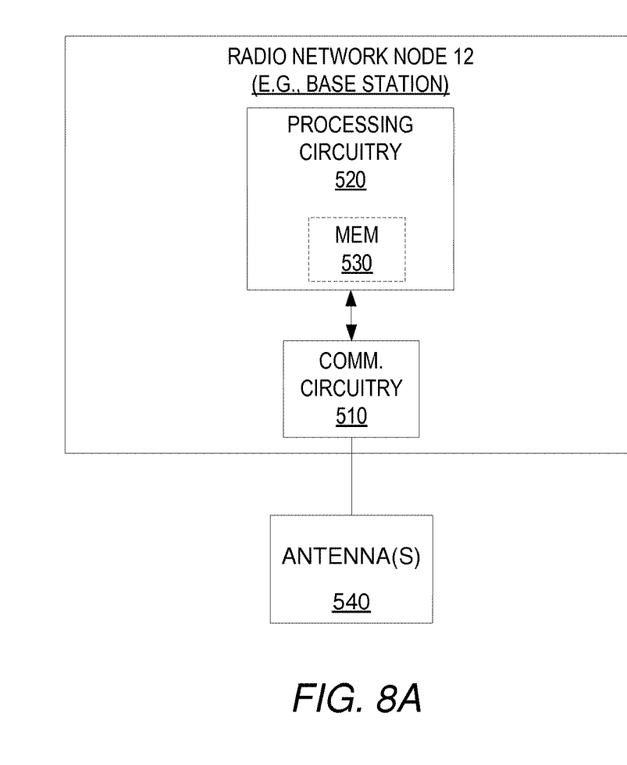
FIG. 8A is a block diagram of a radio network node according to some embodiments.

FIG. 8A illustrates a radio network node 12 in accordance with one or more embodiments. As shown, the radio network node 12 includes communication circuitry 510 and processing circuitry 520. The communication circuitry 510 is configured to transmit and/or receive information to and/or from one or more other nodes, e.g., via any communication technology. The communication circuitry 510 may do so for instance via one or more antennas, which may be internal or external to the radio network node 12. The processing circuitry 520 is configured to perform processing described above, e.g., in FIG. 2, such as by executing instructions stored in memory 520. The processing circuitry 520 in this regard may implement certain functional means, units, or modules.

Figure 8B:
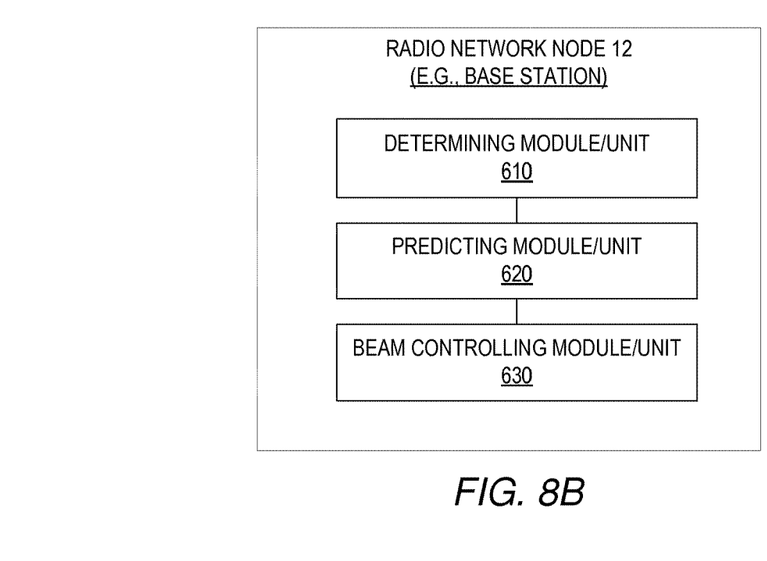
FIG. 8B is a block diagram of a radio network node according to other embodiments.

FIG. 8B illustrates a radio network node 12 in accordance with one or more other embodiments. As shown, the radio network node 12 implements various functional means, units, or modules, e.g., via the processing circuitry 500 in FIG. 8A and/or via software code. These functional means, units, or modules, e.g., for implementing the method in FIG. 2, include for instance a determining unit or module 610 for determining that the wireless device is onboard a public transit vehicle. Also included is a predicting unit or module 620 for, based on determining that the wireless device is onboard the public transit vehicle, predicting a position of the public transit vehicle based on a route schedule of the public transit vehicle and/or positioning measurements received from the public transit vehicle. Further included is a beam controlling unit or module 630 for controlling beamforming for the wireless device based on the predicted position of the public transit vehicle. This controlling may comprise at least one of: dynamically adjusting a direction of a beam on which the radio network node transmits to or receives from the wireless device, as needed for the direction of the beam to track movement of the public transit vehicle; and selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

Those skilled in the art will also appreciate that embodiments herein further include corresponding computer programs.

A computer program comprises instructions which, when executed on at least one processor of a radio network node 12, cause the radio network node 12, to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a radio network node 12—cause the radio network node 12 to perform as described above.

Embodiments further include a computer program product comprising program code portions for performing the steps of any of the embodiments herein when the computer program product is executed by a radio network node 12. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a radio network node serving a wireless device in a wireless communication system; the method comprising the radio network node:
   determining that the wireless device is onboard a public transit vehicle;
   based on the determining, predicting a position of the public transit vehicle based on a route schedule of the public transit vehicle and/or positioning measurements received from the public transit vehicle; and
   controlling beamforming for the wireless device based on the predicted position of the public transit vehicle, wherein the controlling comprises:
      dynamically adjusting a direction of a beam on which the radio network node transmits to or receives from the wireless device, as needed for the direction of the beam to track movement of the public transit vehicle; and/or
      selecting a beam on which to transmit to or receive from the wireless device, by identifying, from among candidate beams in a set, a subset of the candidate beams with coverage in a vicinity of the predicted position of the public transit vehicle, and selecting a candidate beam in the subset.

2. The method of claim 1, wherein the predicting comprises predicting the position of the public transit vehicle based on the route schedule of the public transit vehicle.

3. The method of claim 2, wherein the predicting comprises:
   determining a position at which the route schedule indicates the public transit vehicle will be at a particular time in the future; and
   predicting a position at which the public transit vehicle will be at the particular time in the future, based on the determined position.

4. The method of claim 1, wherein the predicting comprises predicting a position of the public transit vehicle based on positioning measurements received from the public transit vehicle.

5. The method of claim 1, wherein the predicting comprises predicting a position of the public transit vehicle at a future time by extrapolating a position of the public transit vehicle as indicated by a positioning measurement received from the public transit vehicle, using a speed vector obtained for the public transit vehicle.

6. The method of claim 1, wherein the predicting comprises predicting a position $P_{t_2}$ of the public transit vehicle at a future time $t_2$ as either $P_{t_2} = P_{t_1} + \text{speed} \cdot t_2$ or $$P_{t_2} = P_{t_1} + \text{speed} \cdot t_2 + \text{acceleration} \cdot \frac{t_2^2}{2},$$

where $P_t$ is the position of the public transit vehicle at a time $t_1$, speed is a speed vector obtained for the public transit vehicle, and acceleration is an acceleration vector obtained for the public transit vehicle.

7. The method of claim 1, wherein the determining that the wireless device is onboard the public transit vehicle comprises identifying that the wireless device moves in sync with the public transit vehicle.

8. The method of claim 1, wherein the determining that the wireless device is onboard the public transit vehicle comprises:
   determining a coarse trajectory of the wireless device using beam tracking; and
   matching the coarse trajectory of the wireless device with an estimated or predicted trajectory of the public transit vehicle.

9. The method of claim 1, wherein the determining that the wireless device is onboard the public transit vehicle comprises receiving information indicating detection of the wireless device by a device onboard the public transit vehicle.

10. The method of claim 1:
    wherein the predicting comprises predicting a position of the public transit vehicle based on the route schedule of the public transit vehicle and/or positioning measurements received from the public transit vehicle; and
    wherein the dynamically adjusting comprises adjusting the direction of the beam to point towards the predicted position of the public transit vehicle.

11. The method of claim 1:
    wherein a table maps candidate device positions within a coverage area of the radio network node to candidate beams in the set, the table being accessible by the radio network node; and
    wherein the identifying comprises identifying the subset of candidate beams by identifying to which of the candidate beams the table maps positions within a defined vicinity of the predicted position of the public transit vehicle.

12. The method of claim 1, further comprising:
    receiving, from the wireless device, a measurement report indicating a received quality of a reference signal transmitted on the beam; and
    selecting a beam on which to transmit to or receive from the wireless device, responsive to the received quality being below a defined threshold.

13. A radio network node configured to serve a wireless device in a wireless communication system, the radio network node comprising:
    processing circuitry; and
    memory containing instructions executable by the processing circuitry whereby the radio network node is configured to:
       determine that the wireless device is onboard a public transit vehicle;
       based on determining that the wireless device is onboard the public transit vehicle, predict a position of the public transit vehicle based on a route schedule of the public transit vehicle and/or positioning measurements received from the public transit vehicle; and
       control beamforming for the wireless device based on the predicted position of the public transit vehicle, by:
          dynamically adjusting a direction of a beam on which the radio network node transmits to or receives from the wireless device, as needed for the direction of the beam to track movement of the public transit vehicle; and/or
          selecting a beam on which to transmit to or receive from the wireless device, by identifying, from among candidate beams in a set, a subset of the candidate beams with coverage in a vicinity of the predicted position of the public transit vehicle and selecting a candidate beam in the subset.

14. The radio network node of claim 13, wherein the instructions are such that the radio network node is operative to predict the position of the public transit vehicle based on the route schedule of the public transit vehicle.

15. The radio network node of claim 14, wherein the instructions are such that the radio network node is operative to predict the position of the public transit vehicle by:
   determining a position at which the route schedule indicates the public transit vehicle will be at a particular time in the future; and
   predicting a position at which the public transit vehicle will be at the particular time in the future, based on the determined position.

16. The radio network node of claim 13, wherein the instructions are such that the radio network node is operative to predict the position of the public transit vehicle based on positioning measurements received from the public transit vehicle.

17. The radio network node of claim 13, wherein the instructions are such that the radio network node is operative to predict the position of the public transit vehicle by predicting a position of the public transit vehicle at a future time by extrapolating a position of the public transit vehicle as indicated by a positioning measurement received from the public transit vehicle, using a speed vector obtained for the public transit vehicle.

18. The radio network node of claim 13, wherein the instructions are such that the radio network node is operative to determine that the wireless device is onboard the public transit vehicle by identifying that the wireless device moves in sync with the public transit vehicle.

19. The radio network node of claim 13, wherein the instructions are such that the radio network node is operative to determine that the wireless device is onboard the public transit vehicle by receiving information indicating detection of the wireless device by a device onboard the public transit vehicle.

20. A non-transitory computer readable recording medium storing a computer program product for controlling a radio network node serving a wireless device in a wireless communication system; the computer program product comprising software instructions which, when run on processing circuitry of the radio network node, causes the radio network node to:
   determine that the wireless device is onboard a public transit vehicle;
   based on the determining, predict a position of the public transit vehicle based on a route schedule of the public transit vehicle and/or positioning measurements received from the public transit vehicle; and
   control beamforming for the wireless device based on the predicted position of the public transit vehicle, wherein the controlling comprises:
      dynamically adjusting a direction of a beam on which the radio network node transmits to or receives from the wireless device, as needed for the direction of the beam to track movement of the public transit vehicle; and/or
      selecting a beam on which to transmit to or receive from the wireless device, by identifying, from among candidate beams in a set, a subset of the candidate beams with coverage in a vicinity of the predicted position of the public transit vehicle, and selecting a candidate beam in the subset.

* * * * *